United States Patent
Marshall et al.

(10) Patent No.: US 7,695,529 B1
(45) Date of Patent: Apr. 13, 2010

(54) METHOD FOR MANUFACTURING AN ELECTROLYTIC CAPACITOR WITH IMPROVED DEFORMATION QUALITIES

(75) Inventors: Timothy R. Marshall, Pickens, SC (US); James L. Stevens, Irmo, SC (US); Christopher R. Feger, Clemson, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 110 days.

(21) Appl. No.: 11/734,847

(22) Filed: Apr. 13, 2007

(51) Int. Cl.
*H01G 9/02* (2006.01)

(52) U.S. Cl. ............ 29/25.03; 361/523; 361/525

(58) Field of Classification Search ............ 29/592.1, 29/594, 2.41–25.42; 361/516, 523, 323, 361/311–313, 305; 427/80; 429/30
See application file for complete search history.

(56) References Cited

U.S. PATENT DOCUMENTS

| | | | |
|---|---|---|---|
| 4,663,824 A * | 5/1987 | Kenmochi | 29/25.03 |
| 6,099,600 A | 8/2000 | Yan et al. | |
| 6,184,160 B1 | 2/2001 | Yan et al. | |
| 6,375,688 B1 * | 4/2002 | Akami et al. | 29/25.03 |
| 6,605,127 B2 | 8/2003 | Narusawa | |
| 6,882,519 B2 | 4/2005 | Uzawa et al. | |
| 6,919,240 B2 | 7/2005 | Uzawa et al. | |
| 7,196,899 B1 * | 3/2007 | Feger et al. | 361/512 |
| 7,531,010 B1 * | 5/2009 | Feger et al. | 29/25.03 |
| 2004/0207974 A1 | 10/2004 | Uzawa et al. | |
| 2004/0246655 A1 | 12/2004 | Uzawa et al. | |

* cited by examiner

*Primary Examiner*—Minh Trinh
(74) *Attorney, Agent, or Firm*—Steven M. Mitchell

(57) ABSTRACT

A method for manufacturing an electrolytic capacitor with improved deformation qualities includes impregnating an electrolytic capacitor with a first electrolyte, aging the electrolytic capacitor after impregnating and reimpregnating the electrolytic capacitor with a second electrolyte. The water content of the second electrolyte is lower than the water content of the first electrolyte. The second electrolyte may also have a lower viscosity and a higher conductivity than the first electrolyte.

10 Claims, 3 Drawing Sheets

METHOD FOR MANUFACTURING AN ELECTROLYTIC CAPACITOR WITH IMPROVED DEFORMATION QUALITIES

BACKGROUND OF THE INVENTION

1. Field of the Invention

The present invention relates to a method for manufacturing electrolytic capacitors with improved deformation qualities wherein two different electrolytes are utilized in the manufacturing process.

2. Background Art

Compact, high voltage capacitors are utilized as energy storage reservoirs in many applications, including implantable medical devices. These capacitors are required to have a high energy density since it is desirable to minimize the overall size of the implanted device. This is particularly true of an Implantable Cardioverter Defibrillator (ICD), also referred to as an implantable defibrillator, since the high voltage capacitors used to deliver the defibrillation pulse can occupy as much as one third of the ICD volume.

An ICD is a medical device that is implanted in a patient to monitor electrical activity of the heart and to deliver appropriate electrical and/or drug therapy, as required. ICDs include, for example, pacemakers, cardioverters and defibrillators. The term "implantable cardioverter defibrillator" or simply "ICD" is used herein to refer to any implantable cardiac device.

An ICD may be programmed to sense a tachyarrhythmia and to deliver an escalating series of pulse therapies in an effort to correct this arrhythmia. For example, U.S. Pat. No. 5,458,619 to Olson shows a device that begins charging high voltage capacitors on detection of an arrhythmia. During the charging period, the device delivers a series of antitachycardia (ATC) pacing pulses. The number of pulses may be varied as a function of the voltage to which the capacitors are to be charged, so that more extended therapies may be available where allowed by longer charging times. After the ATC pulses, the device evaluates the heart rhythm to determine whether the tachyarrhythmia has terminated. If not, when the capacitor has charged, a high voltage cardioversion or defibrillation pulse is delivered.

ICDs, such as those disclosed in U.S. Pat. No. 5,131,388, incorporated herein by reference, typically use two electrolytic capacitors in series to achieve the desired high voltage for shock delivery. For example, an implantable cardioverter defibrillator may utilize two 350 to 400 volt electrolytic capacitors in series to achieve a voltage of 700 to 800 volts.

Electrolytic capacitors are used in ICDs because they have the most nearly ideal properties in terms of size, reliability and ability to withstand relatively high voltage. Conventionally, such electrolytic capacitors typically consist of a cathode electrode, an electrically conductive electrolyte and a porous anode with a dielectric oxide film formed thereon. While aluminum is the preferred metal for the anode plates, other metals such as tantalum, magnesium, titanium, niobium, zirconium and zinc may be used. A typical electrolyte may be a mixture of a weak acid and a salt of a weak acid, preferably a salt of the weak acid employed, in a polyhydroxy alcohol solvent. The electrolytic or ion-producing component of the electrolyte is the salt that is dissolved in the solvent. The entire laminate is rolled up into the form of a substantially cylindrical body, or wound roll, that is held together with adhesive tape and is encased, with the aid of suitable insulation, in an aluminum tube or canister. Connections to the anode and the cathode are made via tabs. Alternative flat constructions for aluminum electrolytic capacitors are also known, comprising a planar, layered, stack structure of electrode materials with separators interposed therebetween, such as those disclosed in the above-mentioned U.S. Pat. No. 5,131,388. Conventional capacitor cases using metallic cases are generally known, such as those disclosed in U.S. Pat. No. 5,522,851 issued to Fayram.

Aluminum electrolytic capacitors tend to degrade with time. This is due, in part, to water in the electrolyte attacking the thin film of aluminum oxide ($Al_2O_3$) formed on the anode surface. Deformation of the aluminum oxide increases the leakage current of the capacitor, such that when one or more capacitors are used for shock delivery in an ICD, the first shock (after a hiatus) will have a significantly longer charge time. Unfortunately, one cannot remove all of the water from the electrolyte, as it is needed for conduction, as well as during the aging process for the formation of aluminum oxide on the cut edges of the aluminum anode foil after assembly. Therefore, what is needed in the art is a method of maximizing the water content in the electrolyte during the aging process while reducing the overall water content within the electrolyte of a finished electrolytic capacitor in order to reduce degradation and deformation of the capacitor over time.

BRIEF SUMMARY OF THE INVENTION

Disclosed herein is a method of manufacturing an electrolytic capacitor with improved deformation qualities. The electrolytic capacitor is impregnated with a first electrolyte, is aged after impregnation, and reimpregnated after aging with a second electrolyte. The water content of the second electrolyte is lower than the water content of the first electrolyte.

The second electrolyte may also have a lower viscosity than the first electrolyte which may be accomplished by varying the weight percentage of a co-solvent such that the second electrolyte has a higher weight percentage of co-solvent than the first electrolyte.

The second electrolyte may also have a higher conductivity than the first electrolyte which may be accomplished by varying the weight percentage of a dicarboxylic acid such that the second electrolyte has a higher weight percentage of dicarboxylic acid than the first electrolyte.

BRIEF DESCRIPTION OF THE DRAWINGS/FIGURES

DETAILED DESCRIPTION OF THE INVENTION

The present invention relates to a method for manufacturing electrolytic capacitors with improved deformation qualities wherein two different electrolytes are utilized in the manufacturing process.

Preferred embodiments of the present invention are now described. While specific configurations and arrangements are discussed, it should be understood that this is done for illustrative purposes only. A person skilled in the relevant art will recognize that other configurations and arrangements can be used without departing from the spirit and scope of the invention. It will also be apparent to a person skilled in the relevant art that this invention can be employed in a variety of other devices and applications.

Figure 1:
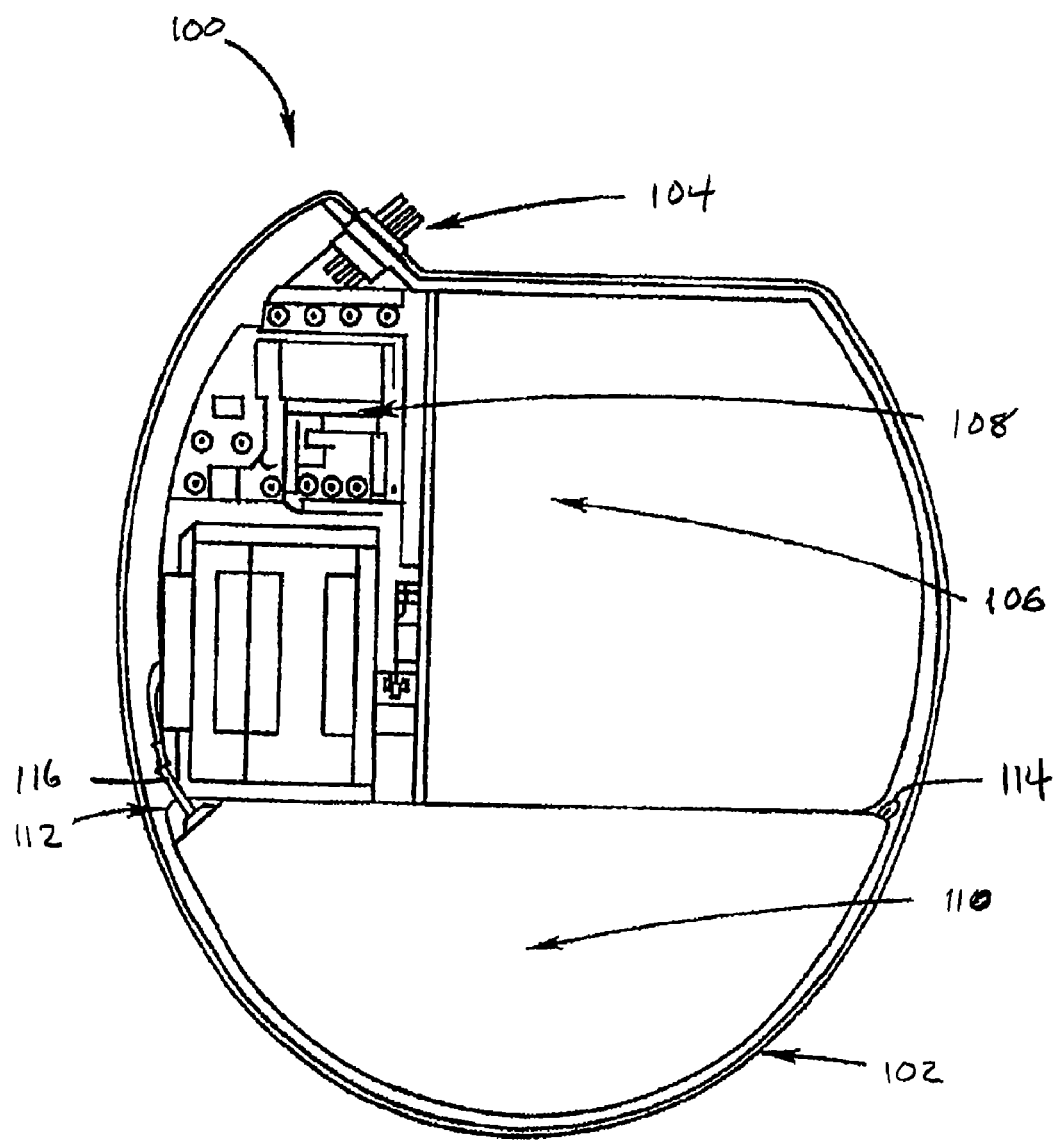
FIG. 1 shows an exemplary implantable medical device.

FIG. 1 illustrates an exemplary ICD 100, having a portion of its outer housing removed to show interior components. ICD 100 includes an outer housing 102 that includes a lead set feed through connector 104 for attachment of an endocardial lead set (not shown). Housing 102 contains a battery cell 106, electronic circuitry 108, and two capacitors 110, 112. Battery 106 provides electrical energy to a transformer in the circuitry 108 to thereafter charge capacitors 110, 112. Capacitors 110, 112 are connected to each other in series through insulated wire 114, and connected to circuitry 108 through insulated wire 116. Capacitors 110, 112 provide the high voltage energy needed so that ICD 100 may deliver a high voltage shock, such as a defibrillating shock, to a patient.

Figure 2:
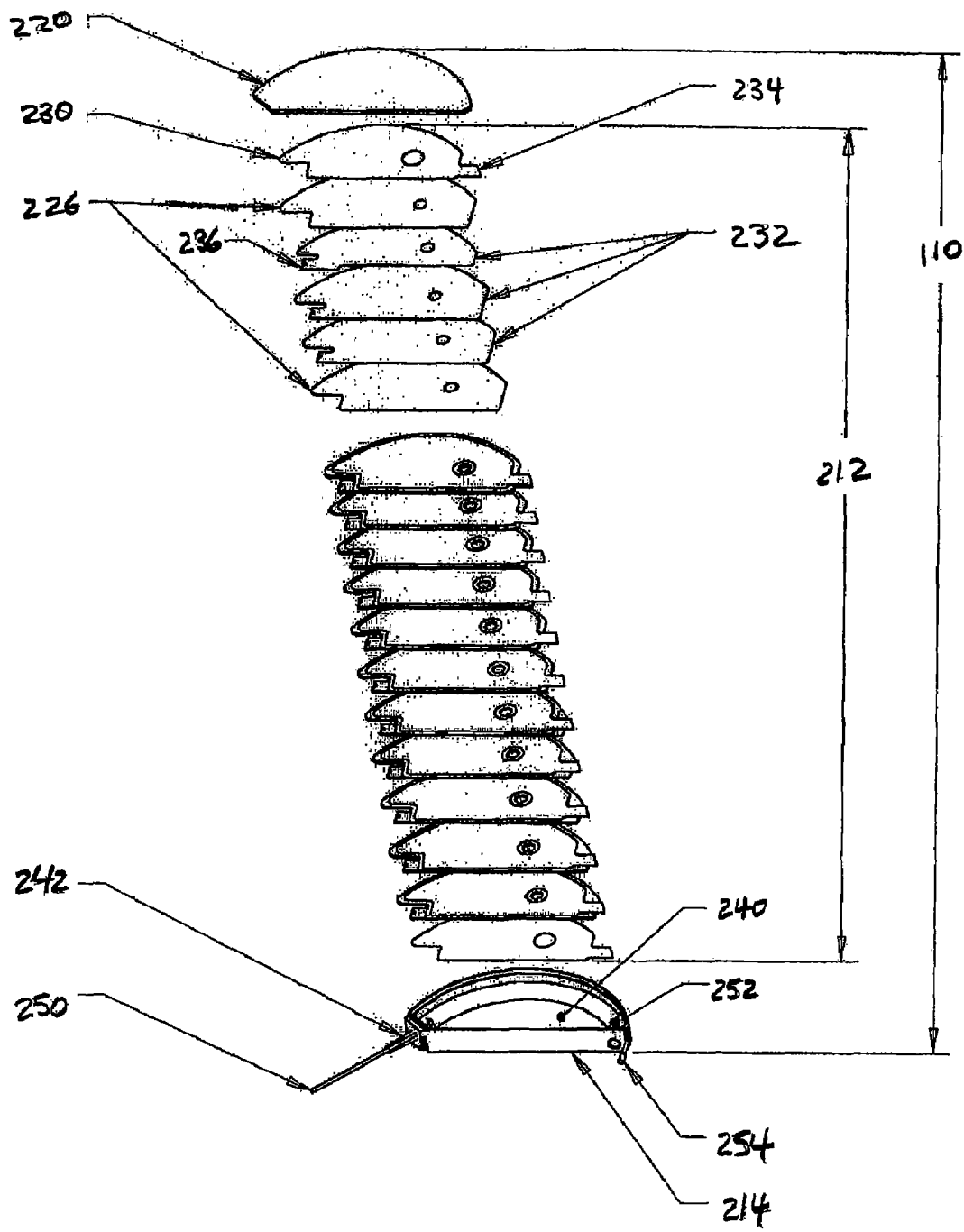
FIG. 2 shows an exploded view of an exemplary electrolytic capacitor having a multiple anode flat-stacked capacitor configuration.

FIG. 2 shows an exploded view of capacitor 110. Although the capacitor shown is a multiple anode flat-stacked capacitor configuration, it is noted that alternative configurations may be employed, as would be apparent to one of ordinary skill in the art. A flat stack 212 consists of alternating conductive and separator sheets within a housing, or base 214, which is enclosed by a lid 220. The sheets alternate between separator sheets 226, and conductive cathode sheets 230 or anode sheets 232. In the spaces formed between adjacent separator sheets, the cathodes alternate with the multiple anodes. Each of the cathodes 230 has a cathode tab 234, all of which are aligned with each other to be compressed together for electrical interconnection. Similarly, each of the anodes 232 has an anode tab 236, aligned with each other to be compressed together for electrical interconnection. The illustration shows each anode layer having three anodes sheets per layer. Alternatively, there may be two or more anodes per layer.

One or both of the end cathodes may be removed, with base 214 connected to the other cathodes and functioning as a cathode. Base 214 defines an aperture 240 in which stack 212 is closely received. Base 214 may be formed of aluminum or alternative materials such as stainless steel, plastic, or other suitable materials. Similarly, lid 220 may be formed of aluminum or alternative materials such as stainless steel, plastic, or other suitable materials. Aperture 240 has a depth about equal to the thickness of stack 212. Base 214 is provided with a feed through connector 242, which has an electrically conductive lead 250 that extends out of the base for connection to other circuitry, with an insulative sleeve surrounding the lead and closely received in a bore defined in the wall of the base to form an environmental seal. Anode tabs 236 are welded together and electrically connected to terminal of feed through 242. Base 214 also includes a cathode attachment step 252 in its interior at a position registered with the ends of cathode tabs 234, so that the tabs may be stacked or welded as a bundle to the step for electrical connection to the base. A cathode lead 254 is directly electrically connected to the base for connection to the cathodes. In an embodiment in which the cathode is isolated from the base, in which the base is non-conductive, or in which cathodes of different groups are isolated from each other, insulated feed throughs like those for the anodes may be used.

Aluminum foil is preferred for the anode layers, because of its ability to produce a sufficient quality oxide layer, its conductive properties, and its wide commercial availability. Other metal foils conventionally utilized in electrolytic capacitors could also be used, including titanium, tantalum, magnesium, niobium, zirconium and/or zinc. For example, the anode layers can be strips or sheets of unetched, high purity (99.99%) aluminum foil with high cubicity, wherein at least 85% of the crystalline aluminum structure is oriented in a normal position (i.e., a (1,0,0) orientation) relative to the surface of the foil. Such foils are well-known in the art and are readily available from commercial sources known to those skilled in the art.

In another embodiment, the anode foil may be etched to increase surface area, such as in an aqueous halide based etch solution, typically a hydrochloric acid or sodium chloride solution, according to a conventional etch process. For example, U.S. Pat. No. 5,715,133 to Harrington et al. describes a suitable method of etching foil, the disclosure of which is incorporated herein by reference in its entirety. The etch solution can consist of about 1.3% by weight sodium chloride, about 3.5% by weight sodium perchlorate, about 0.35% sodium persulfate, and deionized water. The etch solution is heated to a temperature in the range of about 60° C. to about 95° C. The foil is etched at a DC current density of about 0.01 A/cm$^2$ to about 0.30 A/cm$^2$. A charge of about 20 coulombs/cm$^2$ to 100 coulombs/cm$^2$ is passed through the foil during the etching process, which requires an etch time in the range of about 2 minutes to about 12 minutes.

The etched foil is then removed from the etch solution and rinsed in deionized water. The tunnels formed during the initial etch are then widened, or enlarged, in a secondary etch solution, typically in an aqueous based nitrate solution between about 1% to about 20% aluminum nitrate, or between about 10% to about 14% aluminum nitrate, with less than about 1% free nitric acid. The etch tunnels are widened to an appropriate diameter by methods known to those in the art, such as those disclosed in U.S. Pat. No. 4,518,471 and U.S. Pat. No. 4,525,249, both of which are incorporated herein by reference.

After the etch tunnels have been widened, the foil is again rinsed with deionized water and dried. Finally, a barrier oxide layer is formed onto one or both surfaces of the metal foil by placing the foil into an electrolyte bath and applying a positive voltage to the metal foil and a negative voltage to the electrolyte. The barrier oxide layer provides a high resistance to current passing between the electrolyte and the metal foils in the finished capacitor, also referred to as the leakage current. A high leakage current can result in the poor performance and reliability of an electrolytic capacitor. In particular, a high leakage current results in a greater amount of charge leaking out of the capacitor once it has been charged.

The formation process may consist of applying a voltage to the foil through an electrolyte such as boric acid and water or other solutions familiar to those skilled in the art, resulting in the formation of an oxide on the surface of the anode foil. An example electrolyte for formation is a 100-1000 μS/cm, e.g., 500 μS/cm, citric acid concentration. In the case of an aluminum anode foil, the formation process results in the formation of aluminum oxide ($Al_2O_3$) on the surface of the anode foil. The thickness of the oxide deposited or "formed" on the anode foil is proportional to the applied voltage, roughly 10 to 15 Angstroms per applied volt.

The etched and formed anode foils are cut and the capacitor is assembled. A shown in FIG. 2, a multiple anode flat, stacked capacitor configuration 212 consists of a number of units of cathode sheets 230, separator sheets 226, and multiple anode sheets 232. The sheets alternate between separator sheets 226, and conductive cathode sheets 230 or multiple anode sheets 232.

The cathode is preferably formed of a metallic foil of aluminum or titanium, while other alternative metals may be suitable. To increase the capacitance of the cathode, the cathode may be formed of a metallic foil having a metal oxide coating deposited thereon. A paper separator or other fiber with sufficient thickness and density, such as Kraft paper, manila, esparto or hemp, is used to prevent electrical contact between the anode and cathode. Also different porous polymer sheets, such as porous polypropylene, as well as ion conducting polymers, could be used as the separator.

In one embodiment, an electrolytic capacitor is manufactured by providing anode and cathode layers, and stacking them with separator sheets, in the form of a paper insulator or spacer, between adjacent anodes and cathodes. Preferably, aluminum anode foil or other valve metal foil is employed, that has been etched and formed. In one embodiment, the anode layer is composed of two or more anode foils stacked together without any paper spacer, to form a high energy density anode element. The cathode layer is preferably an aluminum foil or film cathode. The anode and cathode layers are then grouped together in a parallel connection to produce sufficient capacitance for the intended function. This finished stack is inserted into a case with a geometry closely following the contour of the stack, and designed to minimize the space occupied inside the finished defibrillator.

Figure 3:
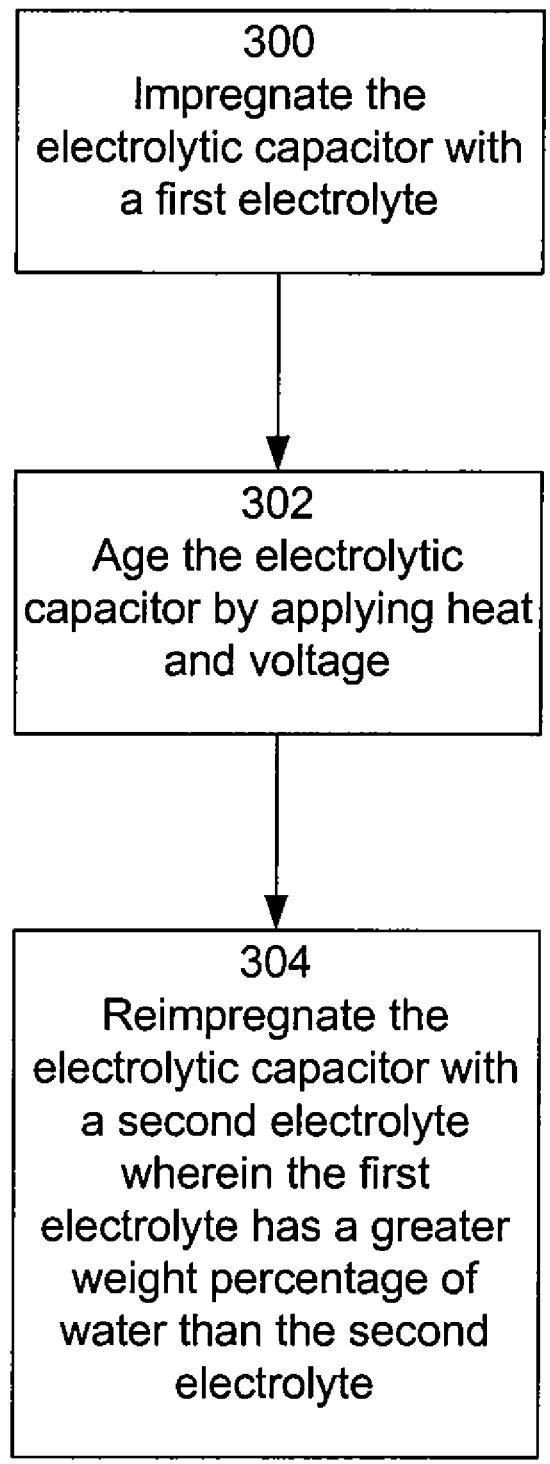
FIG. 3 shows an exemplary flow chart outlining steps for manufacturing an electrolytic capacitor.

Once the capacitor is assembled it is impregnated with a first electrically conductive electrolyte (step 300 of FIG. 3). The electrolyte is typically ethylene glycol based with a dicarboxylic acid, such as for example azelaic acid, and an amine, such as for example ammonia or dimethylamine. The electrolyte can also include a co-solvent, such as for example 2-methoxyethanol. The first electrolyte has a water content greater than 2% by weight, preferably in a range of 2 to 5% by weight. After impregnation, the capacitor is aged (step 302 of FIG. 3). In the aging process the capacitor is heated and has a voltage applied to it to allow aluminum oxide to form on any cut edges of the aluminum anode foils. The aging process also repairs any cracks or defects in the oxide layer of the anodes resulting from handling during the manufacturing process.

The presence of water in the electrolyte enhances the efficiency of the aging process. The water provides oxygen for the formation of the barrier layer of aluminum oxide on the cut edges of the anode foils. In the absence of water in the electrolyte, the aluminum oxide can still be grown, however the oxygen must be obtained from organic constituents in the electrolyte. This requires more energy resulting in an aging process that is slower than when water is present in the electrolyte.

During the aging process hydrogen gas is produced, which expels a considerable portion of the first conductive electrolyte. The hydrogen gas can expel from 30 to 50% of the initial amount of the first conductive electrolyte. This must be replaced or the capacitor will have poor performance in the form of high ESR (Equivalent Series Resistance) and a lower delivered energy. Accordingly, the capacitor is reimpregnated at the conclusion of the aging process (step 304 in FIG. 3).

As noted above, it is preferable to have an electrolyte with water content during the aging process. However, a finished capacitor with a water content greater than the minimum amount needed, about 1% by weight, to maintain good conduction and have a low ESR (Equivalent Series Resistance), will have a greater degree of degradation and deformation. Too much water in the electrolyte of a finished capacitor will lead to attack of the oxide on the anode and possibly, the aluminum cathodes. The water tends to attack the weaker areas of the oxide, exposing the raw aluminum beneath which may then become hydrated. This aluminum oxyhydrate can not support a voltage like the surrounding aluminum oxide until it is electrochemically converted into crystalline or amorphous aluminum oxide. So when a capacitor is placed on voltage, energy has to be expended first to repair these areas, converting the hydrate to a voltage withstanding oxide, before the capacitor can reach operating voltage. Extended periods of non usage increases the amount of hydrated areas, which in turn increases the amount of energy required for capacitor charging, thereby decreasing the charging efficiency. Instability of the oxide in the liquid electrolyte results in degradation over time of the charging efficiency of the capacitor.

In order to benefit from the increased efficiency of the aging process utilizing an electrolyte with a water content higher than what is desired in the finished capacitor, a second, different conductive electrolyte is utilized in the reimpregnation process. The second conductive electrolyte has a lower water content than the first conductive electrolyte. After reimpregnation of the capacitor with the second conductive electrolyte, which can comprise up to 50% of the initial amount of electrolyte, the overall water content of the electrolyte in the finished capacitor is less than that of the first conductive electrolyte.

Preferably, the first electrolyte has a water content of greater than 2% and more preferably, the water content is in a range of 2 to 5%. Preferably, the second electrolyte has a water content in a range of 0 to 1.5%. Preferably, the electrolyte mixture in the finished electrolytic capacitor is in a range of 1.5 to 2.5%.

A typical electrolyte comprises ethylene glycol and the ammonium salt of a dicarboxylic acid. The lower water content electrolyte is preferably made in a process wherein the dicarboxylic acid is dissolved with heating into the ethylene glycol. Anhydrous ammonia gas is then sparged (bubbled) into the solution until the desired pH is reached, which is typically between 7 and 9. Provided that the components were anhydrous to begin with, the electrolyte will also be dry.

The higher water content electrolyte can be made by adding 2 to 5% by weight water to the lower water content electrolyte. Alternatively, the higher water content electrolyte is made by combining under heat, ethylene glycol, the dicarboxylic acid and a sufficient amount of aqueous solution of ammonium hydroxide to neutralize the acid.

Other advantages of utilizing two different electrolytes include each electrolyte having different viscosities and conductivity. In a preferred embodiment, the first conductive electrolyte has a higher viscosity than the second conductive electrolyte. Viscosity of the electrolyte can be changed by differing the amount of a co-solvent, such as 2-methoxyethanol. 2-methoxyethanol lowers the viscosity of an electrolyte, accordingly, preferably the second conductive electrolyte has a greater weight percentage of 2-methoxyethanol than the first conductive electrolyte.

As the viscosity of a typical electrolyte is reduced, the ionic mobility is increased. This allows the charge carriers in the electrolyte to move more freely, allowing access to even smaller structures in the anode foil. This in turn can lead to better realization of the anode surfaces, yielding higher delivered energies. Therefore, reimpregnating with a second conductive electrolyte that has a lower viscosity than the first conductive electrolytes allows the advantages of both systems to be realized.

In a preferred embodiment, the first conductive electrolyte has a lower conductivity than the second conductive electrolyte. Electrolyte conductivity can be changed by differing the amount of the dicarboxylic acid, such as azelaic acid. Azelaic acid increases the conductivity of the electrolyte, accordingly, preferably the second conductive electrolyte has a greater weight percentage of azelaic acid than the first conductive electrolyte. Other methods for increasing the conductivity of an electrolyte include adding more water to the electrolyte or increasing the pH of the electrolyte. The conductivity of the first conductive electrolyte is preferably about 2.5 mS (millisemens) and the conductivity of the second conductive electrolyte is preferably about 4.5 mS.

If the electrolyte conductivity is too high during the aging process scintillation can occur, leading to the failure of the capacitor. However, the higher the conductivity of the electrolyte in a finished electrolytic capacitor, the lower the ESR and the better the delivered energy. Therefore, reimpregnating with a second conductive electrolyte that has a higher conductivity than the first conductive electrolyte avoids scintillation during the aging process, while lowering the ESR and improving the delivered energy in the finished capacitor.

Example embodiments of a method of manufacturing an electrolytic capacitor with improved deformation qualities have been described. As noted elsewhere, these example embodiments have been described for illustrative purposes only, and are not limiting. Other embodiments are possible and are covered by the following claims. Such embodiments will be apparent to persons skilled in the relevant art(s) based on the teachings contained herein.

What is claimed is:

1. A method of manufacturing an electrolytic capacitor, comprising:
   impregnating the electrolytic capacitor with a first electrolyte;
   aging the electrolytic capacitor after impregnating the electrolytic capacitor with said first electrolyte; and
   reimpregnating the electrolytic capacitor after aging with a second electrolyte, wherein said first electrolyte comprises water and said second electrolyte comprises water and said first electrolyte comprises a greater weight percentage of water than said second electrolyte.

2. The method of claim 1, wherein said weight percentage of water of said first electrolyte is between 2.0 and 5.0%.

3. The method of claim 2, wherein said weight percentage of water of said second electrolyte is between 0.0 and 1.5%.

4. The method of claim 1, wherein said second electrolyte has a lower viscosity than said first electrolyte.

5. The method of claim 1, wherein said aging comprises heating the electrolytic capacitor and applying a voltage to the electrolytic capacitor to form an oxide on cut edges of at least one anode of said electrolytic capacitor.

6. The method of claim 1, wherein said second electrolyte has a higher conductivity than said first electrolyte.

7. The method of claim 1, wherein said second electrolyte has a higher ionic mobility than said first electrolyte.

8. The method of claim 1, wherein said first electrolyte further comprises ethylene glycol, a dicarboxylic acid and a sufficient amount of an aqueous solution of ammonium hydroxide to neutralize said dicarboxylic acid.

9. The method of claim 1, wherein said first electrolyte further comprises azelaic acid and said second electrolyte further comprises azelaic acid and said second electrolyte comprises a greater weight percentage of azelaic acid than said first electrolyte.

10. The method of claim 1, wherein said first electrolyte further comprises 2-methoxyethanol and said second electrolyte further comprises 2-methoxyethanol and said second electrolyte comprises a greater weight percentage of 2-methoxyethanol than said first electrolyte.

* * * * *